United States Patent [19]

Nobuhara

[11] Patent Number: 4,690,611

[45] Date of Patent: Sep. 1, 1987

[54] AUTOMATIC TRANSFER APPARATUS FOR ELEVATORS

[75] Inventor: Uichi Nobuhara, Kishiwada, Japan

[73] Assignee: Kabushiki Kaisha Kumalift Gijutsu Kenkyusho, Osaka, Japan

[21] Appl. No.: 799,734

[22] Filed: Nov. 19, 1985

[30] Foreign Application Priority Data

Dec. 3, 1984 [JP] Japan .................. 59-184551[U]

[51] Int. Cl.⁴ .................................. B65G 65/00
[52] U.S. Cl. .................. 414/661; 104/172.1; 104/172.2; 198/468.1; 198/746; 198/748; 414/259
[58] Field of Search ................. 414/659–663, 414/277–283, 285–286, 234–239, 259, 749, 253, 257; 198/484.1, 474.1, 732, 631, 574, 746–748, 738, 468.1; 104/172 S, 172.4, 172.3, 172.2, 172.1

[56] References Cited

U.S. PATENT DOCUMENTS

| 1,775,799 | 9/1930 | Young | 414/238 |
|---|---|---|---|
| 2,861,677 | 11/1958 | Van Marle | 198/732 X |
| 3,337,070 | 8/1967 | Guilbert, Jr. | 414/661 |
| 3,447,704 | 6/1969 | Guilbert, Jr. | 414/659 |
| 3,472,177 | 10/1969 | Di Rosa | 104/172 S |
| 3,598,265 | 8/1971 | Aaronson et al. | 414/661 |
| 3,762,531 | 10/1973 | Lee | 414/280 X |
| 4,108,078 | 8/1978 | Kuwertz | 104/172 S |
| 4,352,622 | 10/1982 | Wieschel | 414/277 |

FOREIGN PATENT DOCUMENTS

| 717832 | 9/1965 | Canada | 414/235 |
|---|---|---|---|
| 833174 | 3/1952 | Fed. Rep. of Germany | 414/259 |
| 1014788 | 4/1983 | U.S.S.R. | 414/280 |

Primary Examiner—Joseph E. Valenza
Assistant Examiner—David A. Bucci
Attorney, Agent, or Firm—Wenderoth, Lind & Ponack

[57] ABSTRACT

An automatic transfer apparatus for loading and unloading a push car into and from an elevator is provided. It includes a guide member, a carriage mounted in the guide member, a conveyor for moving the carriage toward the push car, and another conveyor for pulling the push car into and out of the elevator. Firstly the carriage moves toward the push car, pulls it to mount it just on itself, and moves back to its original position to carry it onto the elevator.

3 Claims, 8 Drawing Figures

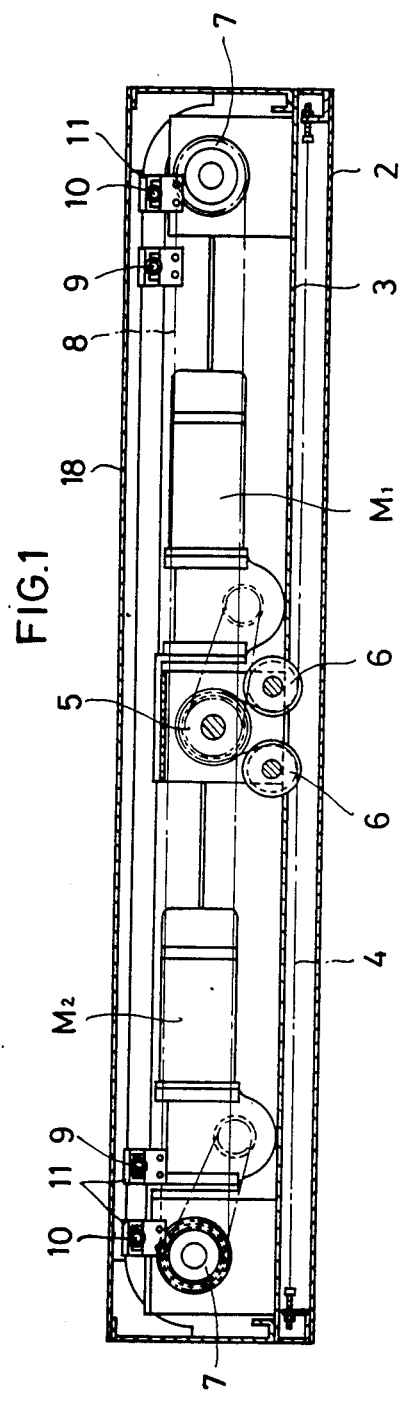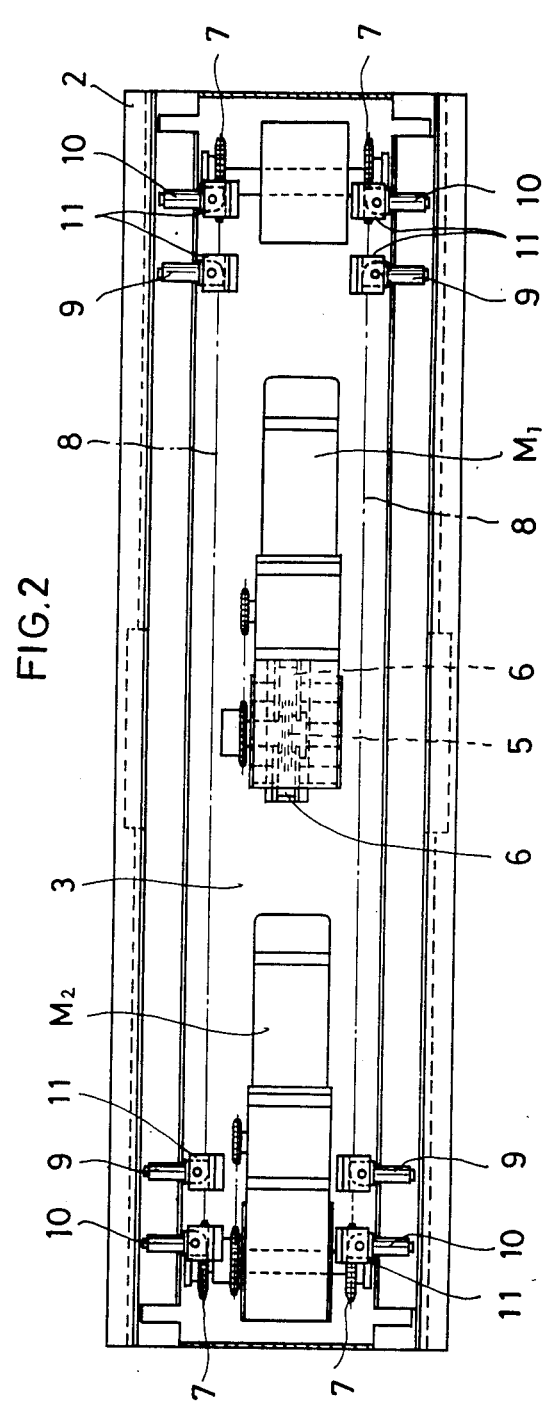

AUTOMATIC TRANSFER APPARATUS FOR ELEVATORS

BACKGROUND OF THE INVENTION

The present invention relates to an automatic transfer apparatus for loading and unloading a push car into and from an elevator.

For conveying a push car from one story of a building to another, it has been a common practice to load an elevator with a push car and unload it by hand. Inefficiency is caused and hard labor is attendant upon this work. Furthermore, the work is attended with danger.

SUMMARY OF THE INVENTION

It is an object of the present invention to provide an automatic transfer apparatus which makes automatic the work of horizontally loading an elevator with a push car and unloading it.

In accordance with the present invention, there is provided an automatic transfer apparatus for loading and unloading a push car into and out an elevator, comprising: a guide means fixedly mounted on the floor of the elevator; a carriage mounted in the guide means so as to be movable while guided by the guide means; a first conveyor means provided in the guide means for moving the carriage along the guide means; a drive means for driving the first conveyor means; a second conveyor means provided on the carriage and having an endless travelling member for conveying a push car into and out of the elevator; a drive means for driving the second conveyor means; and a plurality of pairs of pins secured to the endless travelling member and adapted to engage pins provided on the push car.

With the above-described object in view and as will become apparent from the following detailed description, the present invention will be more clearly understood in connection with the accompanying drawings.

BRIEF DESCRIPTION OF THE DRAWINGS

FIG. 1 is a vertical sectional front view of an automatic transfer apparatus in accordance with the present invention;

FIG. 2 is a horizontal sectional view thereof;

DETAILED DESCRIPTION OF THE INVENTION

Figure 3:
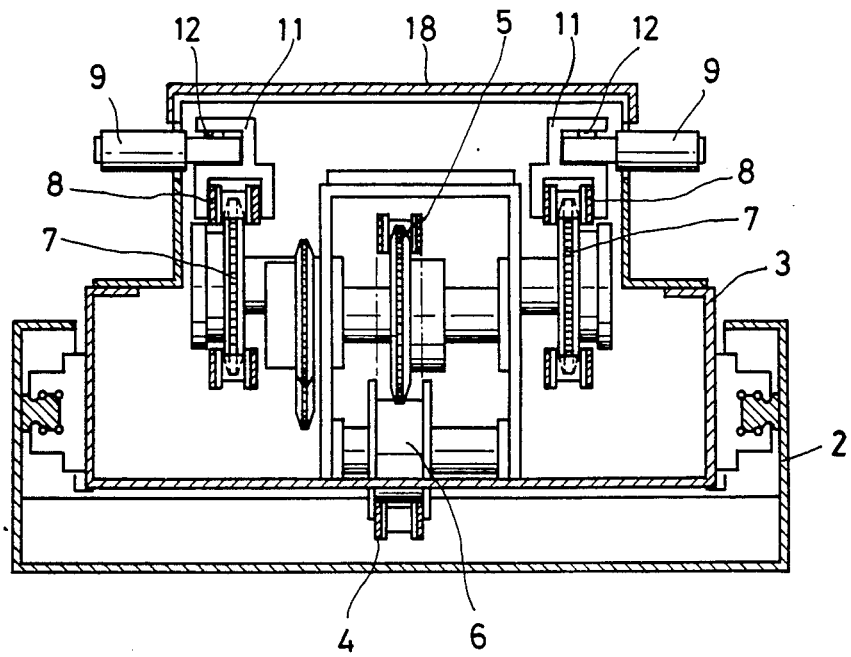
FIG. 3 is a vertical sectional side view thereof.

Referring now to the drawings, an elevator 1 has a guide member 2 fixedly mounted thereon. A carriage 3 mounted in the guide member 2 is adapted to move in a horizontal direction along side walls of the guide member 2.

Both ends of a chain 4 extending in the direction in which the carriage 3 moves are secured to both ends of the guide member 2. The chain 4 passes around a pair of idler rollers 6 and engages with a sprocket wheel 5 provided in the mid portion of the carriage 3. The carriage moves in either direction by a predetermined stroke when a motor $M_1$ (FIGS. 1 and 2) for driving the sprocket wheel 5 is energized.

Figure 5:
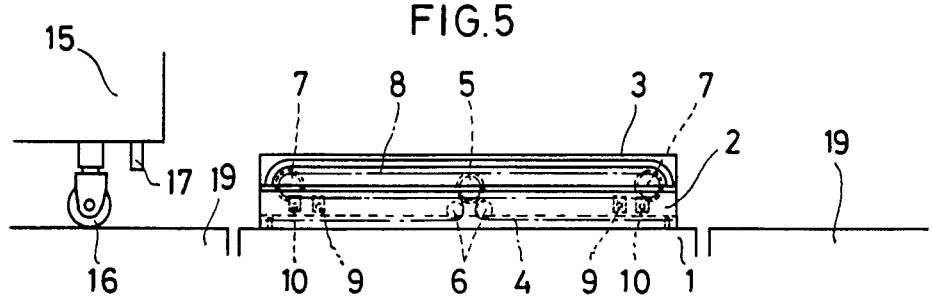
FIGS. 5 to 8 are front views illustrating the operation of the transfer apparatus.
Figure 6:
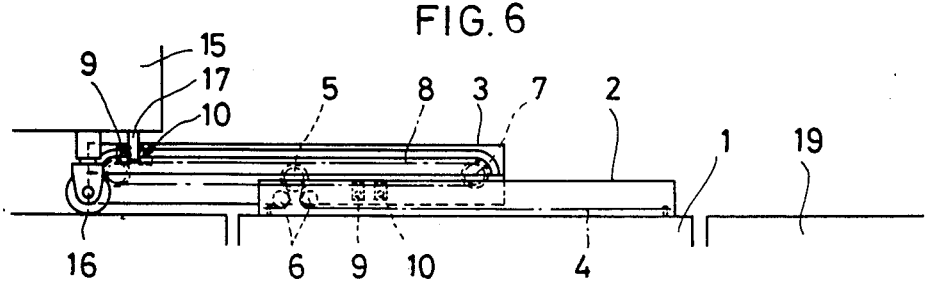

The travel of the carriage 3, which can be set by controlling the motor $M_1$ by means of limit switches, ranges from the position where the full length of the carriage 3 is disposed in the guide member 2 (FIG. 5) to the position where one of the idler rollers 6 reaches one end of the chain 4 so that nearly half the length of the carriage 3 projects from one end of the guide member 2 (FIG. 6).

A pair of endless chains 8 are disposed along both sides of the carriage 3. Each of the endless chains 8 engages with a pair of sprocket wheels 7 provided at both ends of the carriage 3. One of the sprocket wheels 7 is driven by a motor $M_2$ so as to cause the endless chain 8 to travel in either direction.

Two pairs of pins are secured to each endless chain 8, each pair being made up of a pin 9 and a pin 10. The pins on one endless chain 8 are arranged in alignment with the pins on the other endless chain 8.

Figure 4:
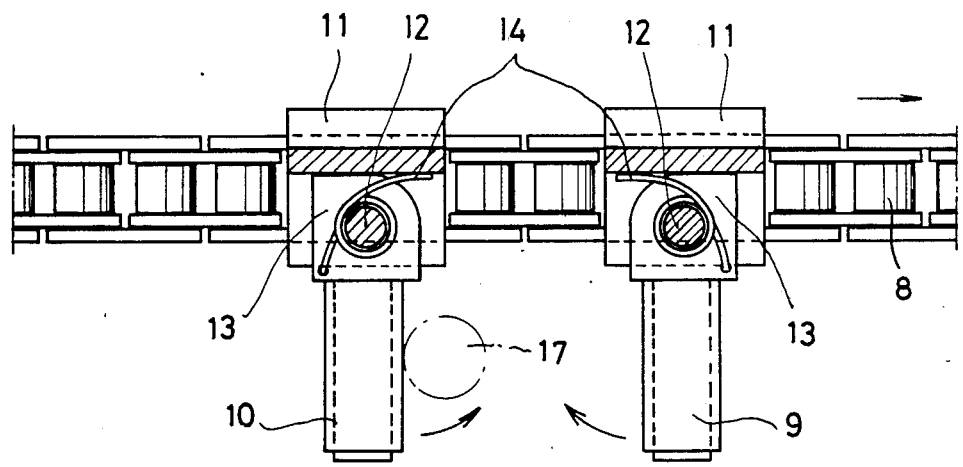
FIG. 4 is an enlarged horizontal sectional view of a pair of pins provided on an endless chain.

Referring now to FIGS. 3 and 4, holders 11 are secured to each endless chain 8. The pins 9 and 10 are mounted on the holders 11 so as to pivot around shafts 12 and horizontally project transversely of the endless chains 8. Each shaft 12 extends through a cam 13 which forms an integral part of the pin 9 or 10 as shown in FIG. 4. The arrangement of the cam 13 on the holder 11 allows the pivotal movement of each pin from a first position where the pin extends normal to the direction of travel of the endless chain 8 to a second position in which the pin tilts toward the other pin. By the provision of a spring 14 positioned about the shaft 12, each pin is urged toward the first position.

A suitable space is left between the pins 9 and 10 in the direction of travel of the endless chain 8. As shown in FIG. 1, the space between two pairs of pins is sufficiently large that two pairs of pins will be disposed at both ends of the upper run of the endless chain 8.

Referring now again to FIGS. 5 to 8, a push car 15 to be carried by the transfer apparatus according to the present invention is adapted to straddle over the transfer apparatus. Wheels 16 are provided at the four corners of the under surface of the push car 15. A pair of downward pins 17 are secured to both sides of the front part of its under surface, and another pair of downward pins 17 are secured to its rear part. Either pair of downward pins 17 are adapted to be engaged between the pins 9 and 10.

The endless chains 8 are shielded with a cover 18 on the carriage 3 with only the pins 9 and 10 projecting transversely from both sides.

In operation, when the elevator 1 is to ascend or descend, the full length of the carriage 3 is disposed in the guide member 2 as shown in FIG. 5.

For conveying the push car 15 from one story of a building to another, it is brought to a standby position near the elevator on a floor 19 as shown in FIG. 5.

When the motor $M_1$ is started, the carriage 3 moves toward the push car 15 as shown in FIG. 6 to such a position that its leading end is under the push car 15. Then the motor $M_1$ stops.

When the motor $M_2$ is started thereafter, the endless chains 8 and hence the pins 9 and 10 run in a clockwise direction in FIG. 6. During this running, a pair of pins 17 secured to the under surface of the push car 15 get caught between the first two pairs of pins 9 and 10, so that the push car will be pulled toward the elevator.

In FIG. 4, the pin 9 disposed in front in relation to the travel direction of the endless chain 8 is adapted to be pivotable backwardly. Consequently, when the pin 9 strikes against the pin 17, the former lets the latter go past. On the contrary, the pin 10 disposed to the rear cannot pivot backwardly but catches the pin 17 so as to draw the push car 15 toward the elevator 1.

The motor $M_2$ is deenergized when two pairs of pins 9 and 10 come to the ends of the upper run of each endless chain 8 as shown in FIG. 1. Then the motor $M_1$ is restarted in the reverse direction so as to restore the carriage 3 to its original position on the guide member 2, carrying the push car 15. Then the motor $M_1$ stops.

Figure 7:
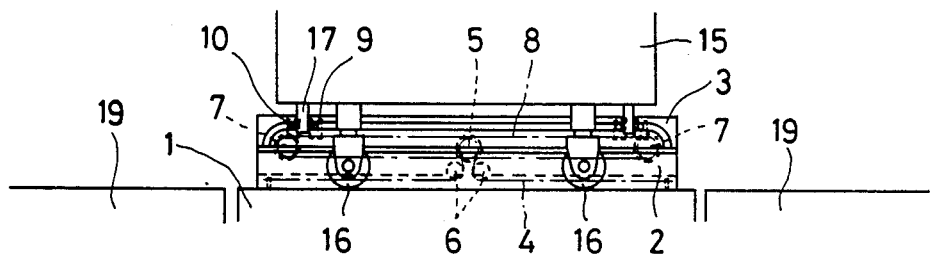

Now the push car 15 is in position on the elevator 1 as shown in FIG. 7, and is ready to be conveyed to another story of the building. When the push car 15 is in this condition, two pairs of the pins 17 secured to the front and the rear parts of the under surface of the push car 15 are engaged between the pins 9 and 10.

Figure 8:
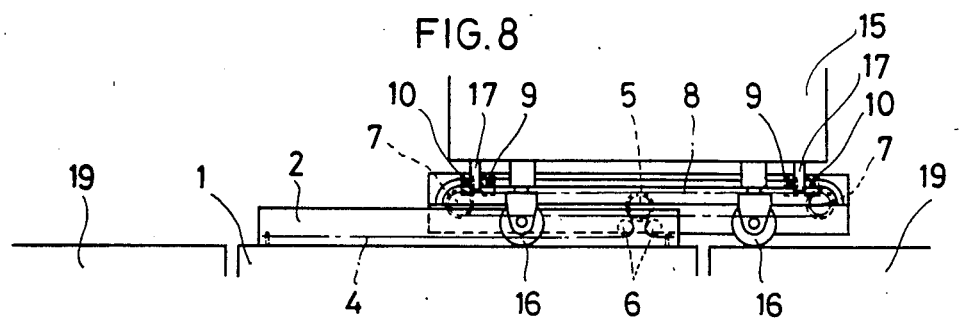

The motors $M_1$ and $M_2$ are controlled in like manner when the push car 15 is delivered off of the elevator 1 to a floor 19. The push car 15 moves together with the carriage 3 as shown in FIG. 8, and is pushed out of the elevator 1 to such a position that the pins 17 secured to the rear part of the under surface of the push car 15 get clear of the pins 9, 10. Then, in preparation for the next operation, the carriage 3 is restored to its original position on the guide member 2 by restarting the motor $M_1$ in the reverse direction.

Thus the transfer apparatus according to the present invention serves to improve efficiency by making automatic the work of horizontally loading the elevator 1 with a push car and unloading it from the elevator. The present invention has another advantage that a push car can be moved on and off the elevator in either direction.

What is claimed is:

1. An automatic transfer apparatus for loading and unloading a push car into and out of an elevator, comprising:
   a guide means fixedly mounted on the floor of the elevator;
   a carriage mounted in said guide means so as to be movable in a direction on and off the elevator while being guided by said guide means;
   a first conveyor means in said guide means and connected to said carriage for reciprocally moving said carriage along said guide means;
   a first drive means connected to said first conveyor means;
   a second conveyor means on said carriage and having an endless travelling member for conveying a push car into and out of the elevator;
   a second drive means connected to said second conveyor means for driving said second conveyor means; and
   a plurality of pairs of pins secured to said endless travelling member, the pins in each pair being spaced in the direction of movement of said endless travelling member and each pin being pivotable only from a first position in which the pin projects transversely of the direction of travel of said endless travelling member to a second position in which the pin is out of said projected position and being pivotable back to said first position, the pivotal movement of the pins in each pair which is in the direction from the first to the second position being pivotal movement toward the other pin of the pair,
   whereby when the carriage member is in a position where it has been moved off the elevator by said first conveyor means, and said endless travelling member is driven to move the endless travelling member toward the elevator, the forward pin in each pair will be pivoted so as to pass a projection on the push car to be loaded and the rear pin in each pair will engage the projection to move the push car onto the elevator, and the rear pin in each pair will similarly engage the projection on the push car to move the car off the elevator when the endless travelling member is driven after the carriage has been moved off the elevator preparatory to unloading the push car from the elevator.

2. An automatic transfer apparatus as claimed in claim 1 in which said endless travelling member is independent of said first conveyor and said second drive means is independent of said first drive means.

3. An automatic transfer apparatus as claimed in claim 1 in which the pins in each pair are spaced from each other sufficiently that when one of the pins is pivoted toward the other, there is further space between them for accommodating the projection on the push car, and said pins each have means for automatically pivoting the pins from the second to the first positions, whereby when a forward pin is pivoted to pass the projection on the push car, the projection will be engaged between the pins of a pair when the forward pin has been moved so that the end is free of the projection and the forward pin is returned to its first position.

* * * * *